United States Patent [19]

Otawa et al.

[11] Patent Number: 5,300,581
[45] Date of Patent: Apr. 5, 1994

[54] PROCESS FOR PRODUCING THERMOPLASTIC ELASTOMER

[75] Inventors: Yasuhiko Otawa, Ichihara; Katsuo Okamoto, Funabashi; Mamoru Kioka; Takashi Ueda, both of Iwakuni, all of Japan

[73] Assignee: Mitsui Petrochemical Industries, Ltd., Tokyo, Japan

[21] Appl. No.: 773,650

[22] PCT Filed: Feb. 18, 1991

[86] PCT No.: PCT/JP91/00194
§ 371 Date: Oct. 18, 1991
§ 102(e) Date: Oct. 18, 1991

[87] PCT Pub. No.: WO91/12283
PCT Pub. Date: Aug. 22, 1991

[30] Foreign Application Priority Data

Feb. 19, 1990 [JP] Japan ................................. 2-38037

[51] Int. Cl.$^5$ .................... C08F 265/02; C08F 269/00
[52] U.S. Cl. .................... 525/301; 525/242; 525/284; 525/302
[58] Field of Search ............ 525/242, 284, 301, 302

[56] References Cited

U.S. PATENT DOCUMENTS 4,001,172  1/1977  Steinkamp et al. ................ 525/301
5,095,059  3/1992  Kitamura et al. .................. 524/272

FOREIGN PATENT DOCUMENTS 0109532  5/1984  European Pat. Off. .
60-71622  4/1985  Japan .
63-25005  5/1988  Japan .

Primary Examiner—John Kight, III
Assistant Examiner—T. Mosley
Attorney, Agent, or Firm—Sherman and Shalloway

[57] ABSTRACT

A process for producing a thermoplastic elastomer having excellent elasticity even with a small rubber content and being excellent in strength, coatability and thermal adhesion to different materials such as various resins, metals or the like, which comprises melting and kneading a material mixture containing (A) particles of a polymer composed of a crystalline olefin polymer portion and a noncrystalline olefin polymer portion, (B) a graft-modifier and (C) a radical initiator to form a graft-modified and crosslinked thermoplastic elastomer having a cyclohexane-insoluble content of at least 40% by weight; and a thermoplastic elastomer obtained by the above method.

18 Claims, No Drawings

PROCESS FOR PRODUCING THERMOPLASTIC ELASTOMER

TECHNICAL FIELD

The present invention relates to a process for producing a thermoplastic elastomer. More specifically, it relates to a process for producing a thermoplastic elastomer, in which there can be efficiently obtained a thermoplastic elastomer which has excellent elasticity even if its rubber content is small and which also has high strength. Further, the present invention relates to a process for producing a thermoplastic elastomer which is not only excellent in heat resistance, tensile strength, weatherability, flexibility, elasticity and low-temperature impact resistance but also excellent in surface smoothness, coatability and thermal adhesion to different materials.

TECHNICAL BACKGROUND

A thermoplastic elastomer has been conventionally widely used as an automobile part such as a bumper, etc. This thermoplastic elastomer has both of thermoplastic properties and elastic properties, and can be molded, by injection molding, extrusion molding, etc, into an article which is excellent in heat resistance, tensile properties, weatherability, flexibility and elasticity.

Japanese Patent Publication No. 34210/1978 discloses a thermoplastic elastomer in which 60 to 80 parts by weight of a monoolefin copolymer rubber and 40 to 20 parts by weight of polyolefin plastic are dynamically and partially cured. Japanese Patent Publication No. 21021/1978 discloses a thermoplastic elastomer comprising (a) a partially crosslinked copolymer rubber composed of an ethylene-propylene-non-conjugated polyene copolymer rubber and having a gel content of 30 to 90% by weight and (b) a polyolefin resin. Further, Japanese Patent Publication No. 18448/1980 discloses a thermoplastic elastomer in which an ethylene-propylene copolymer rubber and a polyolefin resin are dynamically and either partially or completely crosslinked. Meanwhile, Japanese Laid-Open Patent Publication No. 187412/1983 discloses a crosslinked block copolymer which is derived from an olefinic block copolymer containing 50 to 70 parts by weight of a block (A) having a propylene content of 100 to 60% by weight and selected from a propylene homopolymer block and a binary propylene-ethylene or propylene-$C_4$-$C_{12}$ $\alpha$-olefin random copolymer block and 30 to 50 parts by weight of a binary ethylene-propylene random copolymer block (B) having an ethylene content of 30 to 85% by weight, and which has characteristic features in a specific content of a hot xylene-insoluble component and specific fluidity.

Further, Japanese Laid-Open Patent Publications Nos. 165414/1988, 165115/1988 and 161516/1988 and U.S. Pat. No. 4,454,306 disclose a process for producing a crosslinked olefinic block copolymer, which comprises kneading and crosslinking an olefin block copolymer containing a propylene homopolymer block (A) prepared in the presence of a specific Ziegler catalyst, a binary propylene ethylene random copolymer block (B) and a binary propylene ethylene random copolymer block (C) together with an organic peroxide, a divinyl compound and an antioxidant at a temperature of not more than 230° C. Japanese Laid-Open Patent Publication No. 21731/1973 discloses a process for improving a block copolymer in processability, which comprises mixing an organic peroxide with a block copolymer containing 3 to 30% by weight of a copolymer portion which is composed mainly of ethylene and contains not more than 70% by weight of an other $\alpha$-olefin and 97 to 70% by weight of a polymer portion composed mainly of propylene, and subjecting the resultant mixture to heat treatment at a temperature between 180° C. and 270° C.

Further, Japanese Laid-Open Patent Publication No. 90007/1982 discloses a process which comprises mixing 100 parts by weight of a block copolymer or a copolymer composition containing a polypropylene polymer portion and an ethylene propylene copolymer portion having an ethylene unit content of 20 to 80% by weight, in which the intrinsic viscosity of the polypropylene polymer portion is 1.4 to 3 dl/g, the content of this portion is not less than 70% by weight, the intrinsic viscosity of the ethylene.propylene copolymer portion is 4 dl/g, the content of this portion is not less than 2% by weight and the total ethylene unit content is not less than 5% by weight, 0.03 to 10 parts by weight of an $\alpha$, $\beta$-unsaturated carboxylic acid or a derivative thereof, 0.005 to 1 part by weight of a radical reaction initiator and not less than 0.03 part by weight of water, and kneading the resultant mixture while it is melted. The above Publication also discloses that according to this process, there can be obtained a modified polypropylene resin molding material which has a melt flow index of 0.2 to 50 g/10 minutes and a grafted $\alpha$, $\beta$-unsaturated carboxylic acid or its derivative graft in an amount of 0.03 to 5% by weight and which substantially does not contain a gel component. It is described that this modified polypropylene resin molding material substantially does not contain a gel component and that the gel percentage of the gel component insoluble in boiling xylene is hence not more than 2% by weight. That is, the process for producing a modified polypropylene resin molding material, disclosed in the above Publication, is solely intended for graft modification, and it is not intended to carry out the crosslinking at the same time.

The present inventors have made studies to produce a thermoplastic elastomer directly and dynamically by heat-treating polymer particles as an economical process, and found that when polymer particles having a specific composition with regard to crystallizability are used as polymer particles, there can be obtained a molded article which has remarkable uniformity, which has excellent elasticity even if the rubber content is small, which also has excellent strength and further, which has an excellent appearance, an excellent coated appearance in particular. On the basis of finding of these, the present invention has been completed.

DISCLOSURE OF THE INVENTION

It is an object of the present invention to provide a process for producing a thermoplastic elastomer which is graft-modified and crosslinked.

It is another object of the present invention to provide a process for producing a thermoplastic elastomer capable of giving a molded article which has excellent elasticity even if the rubber content is small and excellent strength and which is uniform and excellent in strength-related physical properties such as tensile strength, etc., heat resistance, weatherability, flexibility, elasticity, surface smoothness, coatability, thermal adhesion to a different material and an economical advantage.

Other objects and advantages of the present invention will be apparent from the following description.

According to the present invention, the above objects and advantages of the present invention are achieved by a process for producing a graft-modified and crosslinked thermoplastic elastomer, which comprises melting and kneading a material mixture containing (A) polymer particles comprising a crystalline olefin polymer portion and a noncrystalline olefin polymer portion, (B) a graft-modifier and (C) a radical initiator to form a graft-modified and crosslinked thermoplastic elastomer having a cyclohexane-insoluble content of at least 40% by weight.

The process for producing the thermoplastic elastomer, provided by the present invention, will be specifically described hereinafter.

In the present invention, there are used polymer particles comprising a crystalline olefin polymer portion and a noncrystalline olefin polymer portion.

In the polymer particles used in the present invention, the content of the noncrystalline olefin polymer portion is preferably 20 to 70% by weight, more preferably 25 to 70% by weight, further preferably 30 to 60% by weight, particularly preferably 33 to 55% by weight. In the present invention, the content of such a noncrystalline olefin polymer can be determined by measuring the amount of a component soluble in n-decane at 23° C.

Further, the polymer particles used in the present invention are preferably polymer particles having a thermal history in which the polymer particles substantially have not been heated up to a temperature which is equal to or higher than the higher temperature of the two temperatures, the melting point of the crystalline olefin polymer portion out of the polymer particle-constituting polymers and the glass transition temperature of the noncrystalline olefin polymer out of such polymers.

In the polymer particles which have substantially have not been heated up to a temperature which is equal to or higher than the higher temperature of the two temperatures, the melting point of the crystalline olefin polymer portion and the glass transition temperature of the noncrystalline olefin polymer, the average particle diameter of the island composed of the noncrystalline olefin polymer portion is preferably not more than 0.5 μm, more preferably not more than 0.1 μm, further preferably 0.00001 to 0.05 μm.

The above "noncrystalline olefin polymer portion" refers to a polymer which is soluble in n-decane at 23° C., and more specifically, it refers to a polymer portion which is separated from the solvent in the following manner. That is, while a solution of polymer particles (3 g) in n-decane (500 ml) is stirred, the solution is subjected to a dissolving reaction at 140° to 145° C., and then, the stirring is stopped. And, the solution is cooled to 80° C. over 3 hours, and then to 23° C. over 5 hours, and the solution is further kept at 23° C. for 5 hours. Thereafter, the solution is filtered with a G-4 glass filter, and n-decane is removed from the resultant filtrate, whereby a polymer is obtained. This polymer is called "noncrystalline olefin polymer portion" in the present specification. The average particle diameter of the polymer particles used in the present invention is preferably not less than 10 μm, more preferably 10 to 5,000 μm, further preferably 100 to 4,000 μm, particularly preferably 300 to 3,000 μm. The geometric standard deviation as a measure of the particle distribution of the polymer particles used in the present invention is preferably 1.0 to 3.0, more preferably 1.0 to 2.0, further preferably 1.0 to 1.5, particularly preferably 1.0 to 1.3. The apparent bulk density, by gravity-drop, of the polymer particles used in the present invention is preferably not less than 0.2 g/ml, more preferably 0.2 to 0.7 g/ml, further preferably 0.3 to 0.7 g/ml, particularly preferably 0.35 to 0.60 g/ml.

Further, in the polymer particles used in the present invention, the amount of the particles which pass a 150 mesh is preferably not more than 30% by weight, more preferably not more than 10% by weight, particularly preferably not more than 2% by weight. And, in such polymer particles, the drop time by the unit of second, defined below, is preferably 5 to 25 seconds, more preferably 5 to 20 seconds, particularly preferably 5 to 15 seconds.

The above average particle diameter, apparent bulk density and drop time of the polymer particles are measured and defined as follows.

Average Particle Diameter: 300 Grams of polymer particles were placed on the top of a stainless sieve having a diameter of 200 mm and a depth of 45 mm, supplied by Nippon Rikagaku Kikai K. K., (in which seven sieve elements having meshes of 7, 10, 14, 20, 42, 80 and 150 were placed one on another in this order from the top, and a receiving pan was placed in the bottom), and the sieve was covered. Then, the sieve was set in an IIDA SIEVE SHAKER (supplied by Iida Seisakusho) and shaken for 20 minutes. After the sieve was shaken for 20 minutes, the polymer weight on each of the sieve elements was measured, and the measurement values were plotted on a logarithm probability paper. These plotted points were connected with a curve, and on the basis of the curve, the particle diameter ($D_{50}$) in 50 weight percent of cumulative weight was determined and taken as an average particle diameter.

On the other hand, the geometric standard deviation was also similarly determined on the basis of the particle diameter ($D_{16}$) in 16 weight percent cumulated from the particles having the smallest particle diameter and the above ($D_{50}$) value (geometric standard deviation=$D_{50}/D_{16}$).

Apparent Bulk Density: Measured according to JIS K 6751-1977 (using a funnel having an inlet internal diameter of 92.9 mmφ and an outlet internal diameter of 9.5 mmφ).

Drop Time by the Unit of Second: The same apparatus as that used for the bulk density measurement was used. A sample was dropped on a receiving pan, and the sample heaped up on the receiving pan was dropped down into a 100 ml container by sliding a glass rod. This sample in the 100 ml container was then recharged into the funnel having a damper inserted, and the damper was pulled off. The time (second) required for dropping the entire amount of the sample through the funnel outlet was taken as a drop time.

However, polymer particles having a diameter measuring more than 1.5 to 1.6 times the average particle diameter of the sample were removed from the sample with a sieve, and the remaining polymer particles were used for the drop time measurement.

Further, for the drop time measurement, the receiving pan was set on the vibration bed of a powder tester (Type PT-D, Serial No. 71190, supplied by Hosokawa Micro K. K.), the rheostat voltage was adjusted so that the amplitude of the vibration plate became 1 mm, and the above polymer particles were dropped under vibration.

The polymer particles used in the present invention comprises a crystalline olefin polymer portion and a noncrystalline olefin polymer portion as described above, and have a so-called sea-island structure, and the noncrystalline olefin portion forms an island in each polymer particle. The average particle diameter of the island composed of the noncrystalline olefin polymer portion (the crystalline olefin polymer portion is partly included in some case) is preferably not more than 0.5 $\mu$m, more preferably not more than 0.1 $\mu$m, and further preferably 0.00001 to 0.05 $\mu$m.

The average particle diameter of the island composed of the noncrystalline olefin polymer portion in each polymer particle is measured in the following manner.

The polymer particle is sliced in a thickness of 500 to 1,000 Å at $-140°$ C. with an ultramicrotome. Then, the sliced sample is placed in the gas phase of a sealed, about 1-liter container containing 200 ml of a 0.5% aqueous solution of $RuO_4$ for 30 minutes to stain the noncrystalline olefin polymer portion of the sample. Thereafter, the stained sample is reinforced with carbon, and observed with a transmission electron microscope to determine the particle diameter of the islands with regard to each of at least fifty particles. The average of the island particle diameters obtained is taken as an average particle diameter of the island.

In the present invention, it is preferred to use polymer particles having the above characteristics. Although the method for producing particles having such characteristics is not specially limited, it is preferred to use the following method. In the polymer particles obtained by such a method, the ash content contains a transition metal content in an amount of preferably not more than 100 ppm, more preferably not more than 10 ppm, particularly preferably not more than 5 ppm and a halogen content in an amount of preferably not more than 300 ppm, more preferably not more than 100 ppm, particularly preferably not more than 50 ppm.

The term "polymer" in the present invention refers to both of a homopolymer and a copolymer.

The polymer particles having the above-described characteristics are obtained, for example, by polymerizing or copolymerizing $\alpha$-olefin(s) having 2 to 20 carbon atoms.

Such an $\alpha$-olefin is selected from ethylene, propylene, butene-1, pentene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1 and hexadodecene-1.

Of these, it is preferred to use $\alpha$-olefins having 2 to 8 carbon atoms alone or in combination.

In the present invention, there are used polymer particles containing a recurring unit derived from the above $\alpha$-olefin in an amount of preferably not less than 50 mol %, more preferably not less than 80 mol %, further preferably not less than 90 mol %, particularly preferably 100 mol %.

In the present invention, an unsaturated compound other than the above $\alpha$-olefins may be used, and examples of such other compound include a linear polyene compound, a cyclic polyene compound, a cyclic monoene compound, etc. As a polyene compound, preferred is a linear or cyclic polyene compound having at least two conjugated or non-conjugated olefinic double bonds. The linear polyene compound is specifically selected from 1,4-hexadiene, 1,5-hexadiene, 1,7-octadiene, 1,9-decadiene, 2,4,6-octatriene, 1,3,7-octatriene, 1,5,9-decatriene, divinylbenzene, etc. The cyclic polyene compound is specifically selected from 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbornene, 5-methylene-2-norbornene, 5-vinyl-2-norbornene, 5-isopropylidene-2-norbornene, methylhydroindene, 2,3-diisopropylidene-5-norbornene, 2-ethylidene-3-isopropylidene-5-norbornene, 2-propenyl-2,5-norbornadiene, etc.

Further, in the present invention, examples of the other unsaturated compounds above also include polyene compounds obtained by condensation of cyclopentadienes such as cyclopentadiene, etc., and $\alpha$-olefins such as ethylene, propylene, butene-1, etc., under a Diels-Alder reaction.

Further, in the present invention, examples of the other unsaturated compounds above also include a cyclic monoene compound. The cyclic monoene compound is specifically selected from monocycloalkenes such as cyclopropene, cyclobutene, cyclopentene, cyclohexene, 3-methylcyclohexene, cycloheptene, cyclooctene, cyclodecene, cyclododecene, tetracyclodecene, octacyclodecene, cycloeicosene, etc.; bicycloalkenes such as 2-norbornene, 5-methyl-2-norbornene, 5-ethyl-2-norbornene, 5-isobutyl-2-norbornene, 5,6-dimethyl-2-norbornene, 5,5,6-trimethyl-2-norbornene, etc.; tricycloalkenes such as 2,3,3a,7a-tetrahydro-4,7-methano-1H-indene, 3a,5,6,7a-tetrahydro-4,7-methano-1H-indene, etc.; and 1,4,5,8-dimethano-1,2,3,4,4a,5,8,8a-octahydronaphthalene. In addition to these compounds, the following cyclic monoene compounds are also usable: tetracycloalkenes such as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, etc.; and polycycloalkenes such as hexacyclo[6.6.1.1$^{3,6}$.1$^{10,13}$.0$^{2,7}$.0$^{9,14}$]heptadecene-4, pentacyclo[8.8.1$^{2,9}$.1$^{4,7}$.1$^{11,18}$.0.0$^{3,8}$.0$^{12,17}$]heneicosene-5, octacyclo[8.8.1$^{2,9}$.1$^{4,7}$.1$^{11,18}$.1$^{13,16}$.0$^{3,8}$.0$^{12,17}$]docosene-5, etc.

Furthermore, in the present invention, styrene and styrene having a substituent may be used as other unsaturated compound above.

The polymer particles used in the present invention are obtained by polymerization or copolymerization of a starting material containing the above $\alpha$-olefin in the presence of the catalyst to be described later. The polymerization or copolymerization reaction may be carried out in a gaseous phase (gas phase method) or a liquid phase (liquid phase method).

When the polymerization or copolymerization reaction by a liquid phase method is carried out, it is preferred to carry out the reaction in a suspension state in order to obtain formed polymer particles in a solid state.

When this polymerization or copolymerization reaction is carried out, an inert hydrocarbon may be used, and an α-olefin as a starting material may be used as a reaction solvent. Moreover, the above polymerization or copolymerization reaction may be carried out by a combination of a liquid phase method and a gas phase method. In order to produce the polymer particles for use in the present invention, it is preferred to use a method in which the above polymerization or copolymerization is carried out by a gas phase method, or it is carried out in the presence of an α-olefin as a solvent and thereafter, a gas phase method is employed in combination.

In the present invention, the polymer particles for use as a material in the present invention are produced by a method in which monomers of two or more kinds are charged into a polymerizer and the crystalline olefin polymer portion and the noncrystalline olefin polymer portion are simultaneously formed, or by a method in which the crystalline olefin polymer portion and the noncrystalline olefin polymer portion are synthesized separately but as a series by means of at least two polymerizers. In this case, the latter method is preferred from the viewpoint that the molecular weight, composition and amount of the noncrystalline olefin polymer portion can be optionally changed.

The most preferred is a method in which after the crystalline olefin polymer portion is synthesized by a gas phase method, the noncrystalline olefin polymer portion is synthesized by a gas phase method, or a method in which after the crystalline olefin polymer portion is synthesized in the presence of a monomer as a solvent, the noncrystalline olefin polymer portion is synthesized by a gas phase method.

In the present invention, the above polymerization or copolymerization reaction is carried out, in general, in the presence of a catalyst comprising a catalyst component (A) containing a transition metal and a catalyst component (B) containing an organometallic compound of a metal of group I, group II and group III of the periodic table.

The above catalyst component (A) is preferably selected from catalysts containing transition metal atoms from the groups IVB and VB of the periodic table. Of these, more preferred is a catalyst component containing at least one atom selected from the group consisting of titanium, zirconium, hafnium and vanadium.

The catalyst component (A) is also preferably selected from catalyst components containing a halogen atom and a magnesium atom in addition to the above transition metal atoms and catalyst components containing compounds in which a group having conjugated π-electrons coordinates with transition metal atoms of the groups IVB and VB of the periodic table.

In the present invention, as the catalyst component (A), it is preferred to use a catalyst which is to be present in a solid state in the reaction system or which is supported on a carrier to be present in a solid state when the above polymerization or copolymerization reaction is carried out.

The solid catalyst component (A) which contains a transition metal, a halogen atom and a magnesium atom as above is explained further in detail below as an example.

The average particle diameter of the above solid catalyst component (A) is preferably 1 to 200 μm, more preferably 5 to 100 μm, particularly preferably 10 to 80 μm. The geometric standard deviation (δg) as a measure of the particle distribution of the solid catalyst (A) is preferably 1.0 to 3.0, more preferably 1.0 to 2.1, particularly preferably 1.0 to 1.7.

The average particle diameter and particle distribution of the catalyst component (A) can be measured by a light transmission method. Specifically, a dispersion of 0.1% by weight of a catalyst component (A) sample in a decalin solvent is taken onto a measuring cell, and narrow light is directed to the cell. And, the change in the intensity of narrow light when the particles pass across the narrow light is continuously measured to obtain the particle distribution. The standard deviation (δg) is determined from the logarithm normal distribution function on the basis of the particle distribution. More specifically, the standard deviation is determined as a ratio $(\theta_{50}/\theta_{16})$ of the average particle diameter $(\theta_{50})$ to the diameter $(\theta_{16})$ of particles of which the cumulative amount becomes 16% by weight when counted from the particles having smaller diameters. In addition, the average particle diameter of the catalyst refers to a weight average particle diameter.

The catalyst component (A) preferably has a spherical form, an elliptically spherical form, or a granular form. The aspect ratio of the particles is preferably not more than 3, more preferably not more than 2, particularly preferably not more than 1.5.

The above aspect ratio is determined by observing a catalyst particle group with an optical microscope and measuring freely selected fifty catalyst particles for their major and minor axes.

When the catalyst component (A) contains magnesium, titanium and halogen atoms and an electron donor, the magnesium/titanium atomic ratio is preferably greater than 1. This atomic ratio is more preferably 2 to 50, further preferably 6 to 30. The halogen/titanium atomic ratio is preferably 4 to 100, more preferably 6 to 40. The electron donor/titanium molar ratio is preferably 0.1 to 10, more preferably 0.2 to 6. The specific surface area of the catalyst component (A) is preferably not less than 3 $m^2/g$, more preferably not less than 40 $m^2/g$, further preferably in the range of from 100 to 800 $m^2/g$.

In such a catalyst component (A), in general, the dissociation of the titanium compound contained in the catalyst component does not occur when the catalyst is subjected to a simple operation such as washing with hexane at room temperature.

In addition to the above components, the catalyst component (A) used in the present invention may contain other atoms and metals, and further may have other functional groups introduced, and moreover, it may be diluted with an organic or inorganic diluent.

The above catalyst component (A) can be produced, for example, by a method in which a magnesium compound having its average particle diameter and particle distribution in the above ranges and having a form as described above is first prepared, and then a catalyst is prepared, or by a method in which a liquid magnesium compound and a liquid titanium compound are brought into contact with each other and formed into a solid catalyst having the above particle properties.

Such a catalyst component (A) may be used in an as-produced state, or may be used after the magnesium compound, the titanium compound and, optionally, the electron donor are supported on a carrier having a uniform form. Further, it may be used after a fine powder catalyst is prepared and then imparted with the above desired form.

The above catalyst component (A) is described in Japanese Laid-Open Patent Publications Nos. 135102/1980, 135103/1980, 811/1981, 67311/1981 and 83006/1983.

Some embodiments of the methods of preparing the catalyst component (A) described in the above Publications are as follows.

(1) After solid magnesium compound electron donor complex having an average particle diameter of 1 to 200 μm and a particle distribution of which geometric standard deviation (δg) is not more than 3.0 is or is not preliminarily treated with an electron donor and/or an organoaluminum compound or with a reaction aid such as a halogen-containing silicon compound, the complex is reacted with a halogenated titanium compound, preferably titanium tetrachloride, which is a liquid under the reaction conditions.

(2) A liquid magnesium compound having no reducing capability and a liquid titanium compound are reacted preferably in the presence of an electron donor to precipitate a solid component having an average particle diameter of 1 to 200 μm and a particle distribution of which the geometric standard deviation (δg) is not more than 3.0. Further, as required, the precipitated solid component is reacted with a liquid titanium compound, preferably with titanium tetrachloride, or with a liquid titanium compound and an electron donor.

(3) A liquid magnesium compound having reducing capability and a reaction aid capable of eliminating the reducing capability of the magnesium compound, such as polysiloxane or a halogen-containing silicon compound, are preliminarily brought into contact with each other to precipitate a solid component having an average particle diameter of 1 to 200 μm and a particle distribution (δg) of which the geometric standard deviation is not more than 3.0. Then, the solid component is reacted with a liquid titanium compound, preferably titanium tetrachloride or with a titanium compound and an electron donor.

(4) A magnesium compound having reducing capability is brought into contact with an inorganic carrier such as silica or with an organic carrier, and then, after the carrier is or is not brought into contact with a halogen-containing compound, the carrier is brought into contact with a liquid titanium compound, preferably titanium tetrachloride or with a titanium compound and an electron donor to react the magnesium compound supported on the carrier with the titanium compound, etc.

(5) In the method in (2) or (3), an inorganic carrier such as silica, alumina, etc., or an organic carrier such as polypropylene, polystyrene, etc., is allowed to be co-present to support the magnesium compound.

The catalyst component (A) in such a solid state has the ability to produce a polymer having high stereoregularity at high catalyst efficiency. For example, when a propylene homopolymer is produced in the presence of the solid catalyst component (A), a polypropylene having an isotacticity index (a boiling n-heptane-insoluble content) of not less than 92%, particularly not less than 96% can be usually produced in an amount, per mmol of titanium, of 3,000 g or more, preferably 5,000 g or more, particularly preferably 10,000 g or more.

Examples of the magnesium compound, the halogen-containing silicon compound, the titanium compound and the electron donor which are usable for the preparation of the above catalyst component (A) are as follows. In addition, the aluminum component for use in the preparation of the catalyst component (A) is selected from aluminum compounds to be used for the preparation of the organometallic compound catalyst component (B) to be detailed later.

The magnesium compound is specifically selected from inorganic magnesium compounds such as magnesium oxide, magnesium hydroxide, hydrotalcite, etc., and organic magnesium compounds such as magnesium carboxylate, alkoxy magnesium, allyloxy magnesium, alkoxy magnesium halide, allyloxy magnesium halide, magnesium dihalide, dialkyl magnesium, Grignard reagents, diaryl magnesium, etc.

The titanium compound is specifically selected from titanium halides such as titanium tetrachloride, titanium trichloride, etc., alkoxytitanium halide, allyloxytitanium halide, alkoxy titanium, allyloxy titanium, etc. Of these, preferred are titanium tetrahalides, and particularly preferred is titanium tetrachloride.

The electron donor is selected from oxygen-containing electron donors such as alcohols, phenols, ketones, aldehydes, carboxylic acids, esters of organic or inorganic acids, ethers, acid amides, acid anhydrides and alkoxysilanes; and nitrogen-containing electron donors such as ammonia, amine, nitrile and isocyanate.

The compound which can be used as the above electron donor is specifically selected from:

alcohols having 1 to 18 carbon atoms such as methanol, ethanol, propanol, pentanol, hexanol, octanol, dodecanol, octadecyl alcohol, oleyl alcohol, benzyl alcohol, phenyl ethyl alcohol, isopropyl alcohol, cumyl alcohol, and isopropylbenzyl alcohol;

phenols having 6 to 20 carbon atoms such as phenol, cresol, xylenol, ethylphenol, propylphenol, nonylphenol, cumylphenol and naphthol (these phenols may have a lower alkyl group);

ketons having 3 to 15 carbon atoms such as acetone, methyl ethyl ketone, methyl isobutyl ketone, acetophenone, benzophenone and benzoquinone;

aldehydes having 2 to 15 carbon atoms such as acetaldehyde, propionaldehyde, octylaldehyde, benzaldehyde, tolylaldehyde and naphthoaldehyde;

organic esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl dichloroacetate, ethyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl Nadic acid ester, diisopropyl tetrahydrophthalate, diethyl phthalate, diisobutyl phthalate, di-n-butyl phthalate, di-n-pentyl phthalate, diisopentyl phthalate, di-n-hexyl phthalate, diisohexyl phthalate, di-n-heptyl phthalate, diisoheptyl phthalate, di-n-octyl phthalate, diisooctyl phthalate, di-2-ethylhexyl phthalate, γ-butyrolactone, δ-valerolactone, coumarin, phthalide and ethylene carbonate;

acid halides having 2 to 15 carbon atoms such as acetyl chloride, benzoyl chloride, chorotoluylate and chloroanisate;

ethers having 2 to 20 carbon atoms such as methyl ether, ethyl ether, isopropyl ether, butyl ether, amyl ether, tetrahydrofuran, anisole and diphenyl ether, or preferably diethers;

acid amides such as acetic acid amide, benzoic acid amide and toluylic acid amide;

amines such as methylamine, ethylamine, diethylamine, tributylamine, piperidine, tribenzylamine, aniline, pyridine, picoline and tetramethylenediamine;

nitriles such as acetonitrile, benzonitrile and tolunitrile;

organic phosphorus compounds having a P-O-C bond such as trimethyl phosphite and triethyl phosphite;

alkoxysilanes such as ethyl silicate and diphenyldimethoxysilane; and the like. These electron donors may be used alone or in combination.

Of the above electron donors, preferred are compounds having no active hydrogen such as organic acid or inorganic acid esters, alkoxy (aryloxy) silane compounds, ethers, ketones, tertiary amines, acid halides and acid anhydrides, particularly preferred are organic acid esters and alkoxy (aryloxy) silane compounds. Among these, particularly preferred are esters derived from aromatic monocarboxylic acids and alcohols having 1 to 8 carbon atoms, and esters and diethers derived from dicarboxylic acids such as malonic acid, substituted malonic acid, substituted succinic acid, maleic acid, substituted maleic acid, 1,2-cyclohexanedicarboxylic acid, phthalic acid, etc. and alcohols having at least two carbon atoms. Naturally, it is not always necessary to add any of these electron donors to the reaction system at the time when the catalyst component (A) is prepared. For example, a compound which can be converted to such an electron donor may be added to the reaction system to convert it into the above electron donor during the catalyst preparation.

After the preparation, the catalyst component (A) obtained as above can be purified by fully washing it with a liquid inert hydrocarbon compound. The hydrocarbon used for this washing is specifically selected from:

aliphatic hydrocarbon compounds such as n-pentane, isopentane, n-hexane, isohexane, n-heptane, n-octane, isooctane, n-decane, n-dodecane, kerosine and liquid paraffin;

alicyclic hydrocarbon compounds such as cyclopentane, methylcyclopentane, cyclohexane and methylcyclohexane;

aromatic hydrocarbon compounds such as benzene, toluene, xylene and cymene; and halogenated hydrocarbon compounds such as chlorobenzene and dichloroethane.

The above compounds may be used alone or in combination.

The organometallic compound catalyst component (B) is preferably selected from organoaluminum compounds having at least one Al-carbon bond in the molecule.

Examples of such organoaluminum compounds are:
(i) an organoaluminum compound of the formula, $$R^1_m Al(OR^2)_n H_p X_q \quad (i)$$

(wherein each of $R^1$ and $R^2$ is a hydrocarbon group which generally has 1 to 15, preferably 1 to 4 carbon atoms, and may be the same as, or different from, each other, X is a halogen atom, m is in the range of $0 \leq m \leq 3$, n is in the range of $0 \leq n < 3$, p is in the range of $0 \leq p < 3$, q is in the range of $0 \leq q < 3$, and $m+n+p+q=3$), and (ii) an alkyl compound complex with a metal from the group I of the periodic table and aluminum, of the formula, $$M^1 Al R^1_4 \quad (ii)$$

(wherein $M^1$ is Li, Na or K, and $R^1$ is as defined above).

The organoaluminum compound of the above formula (i) is specifically selected from the following compounds.

Compounds of the formula $R^1_m Al(OR^2)_{3-m}$ (wherein $R^1$ and $R^2$ are as defined above, and m is preferably in the range of $1.5 \leq m \leq 3$).

Compounds of the formula $R^1_m AlX_{3-m}$ (wherein $R^1$ is as defined above, X is a halogen and m is preferably in the range of $0 < m < 3$).

Compounds of the formula $R^1_m AlH_{3-m}$ (wherein $R^1$ is as defined above, and m is preferably in the range of $2 \leq m \leq 3$).

Compounds of the formula $R^1_m Al(OR^2)_n X_q$ (wherein $R^1$ and $R^2$ are as defined above, X is a halogen, $0 < m \leq 3$, $0 \leq n < 3$, $0 \leq q < 3$, and $m+n+q=3$).

The organoaluminum compound of the above formula (i) is specifically selected from:

trialkylaluminums such as triethylaluminum, tributylaluminum, and triisopropylaluminum;

trialkenylaluminums such as triisoprenylaluminum;

dialkylaluminumalkoxides such as diethylaluminumethoxide and dibutylaluminumbutoxide;

alkylaluminumsesquialkoxides such as ethylaluminumsesquiethoxide and butylaluminumsesquibutoxide;

partially alkoxylated alkylaluminums having an average composition of the formula $R^1_{2.5} Al(OR^2)_{0.5}$;

dialkylaluminum halides such as diethylaluminum chloride, dibutylaluminum chloride, diethylaluminum bromide;

alkylaluminum sesquihalides such as ethylaluminum sesquihalide, butylaluminum sesquichloride and ethylaluminum sesquibromide;

partially halogenated alkylaluminums such as ethylaluminum dichloride, propylaluminum dichloride, and butylaluminum dibromide;

dialkylaluminumhydrides such as diethylaluminum hydride and dibutylaluminum hydride;

partially hydrogenated alkylaluminums such as alkylaluminum dihydrides, e.g. ethylaluminumdihydride and propylaluminum dihydride; and partially alkoxylated and halogenated alkylaluminums such as ethylaluminumethoxy chloride, butylaluminumbutoxy chloride and ethylaluminumethoxy bromide.

Further, the organoaluminum compound used in the present invention may be also selected from compounds similar to the compound of the formula (i) such as an organoaluminum compound in which at least two aluminum atoms are bonded to each other through an oxygen or nitrogen atom. Specific examples of such similar compounds are:

(C₂H₅)₂AlOAl(C₂H₅)₂.

(C₄H₉)₂AlOAl(C₄H₉)₂.

and

The organoaluminum compound of the above formula (ii) is specifically selected from LiAl(C$_2$H$_5$)$_4$ and LiAl(C$_7$H$_{15}$)$_4$.

Of the above compounds, particularly preferred are trialkylaluminum, a mixture of trialkylaluminum with alkylaluminum halide and a mixture of trialkylaluminum with aluminum halide.

When the above polymerization reaction is carried out, it is preferred to use an electron donor (C) in combination with the catalyst component (A) and the organometallic compound catalyst component (B).

The electron donor (C) is specifically selected from amines, amides, ethers, ketones, nitriles, phosphines, stibines, arsines, phosphoamides, esters, thioethers, thioesters, acid anhydrides, acid halides, aldehydes, alcoholates, alkoxy (aryloxy) silanes, organic acids, amides of metals belonging to the groups I, II, III and IV of the periodic table, and acceptable salts of these. The salts may be formed in the reaction system under reactions between organic acids and organometallic compounds used as the catalyst component (B).

Specifically, the electron donor is selected from compounds previously described as examples with regard to the catalyst component (A). Of these electron donors, particularly preferred are an organic acid ester, an alkoxy (aryloxy) silane compound, an ether, a ketone, an acid anhydride and an amide. In particular, when the electron donor in the catalyst component (A) is a monocarboxylate, preferred as this electron donor is an alkyl ester of an aromatic carboxylic acid.

Further, when the electron donor in the catalyst component (A) is an ester from a dicarboxylic acid and an alcohol having at least two carbon atoms, preferred as an electron donor (C) is an alkoxy (aryloxy) silane compound of the formula, R$_n$Si(OR$^1$)$_{4-n}$ (wherein each of R and R$^1$ is a hydrocarbon group and $0 \leq n < 4$), or an amine having high steric hindrance.

The alkoxy (aryloxy) silane compound is specifically selected from trimethylmethoxysilane, trimethoxyethoxysilane, dimethyldimethoxysilane, dimethylethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolylmethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, n-propyltriethoxysilane, decylmethoxysilane, decyltriethoxysilane, phenyltrimethoxysilane, γ-chloropropyltrimethoxysilane, methyltriethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanedimethyldimethoxysilane, ethyl silicate, butyl silicate, trimethylphenoxysilane, methyltriallyoxysilane, vinyltris(β-methoxyethoxysilane) and dimethyltetraethoxydisiloxane. Of these, particularly preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolylmethoxysilane, p-tolylmethyldimethoxysilane, dicyclohexyldimethoxysilane, cyclohexylmethyldimethoxysilane, 2-norbornanetriethoxysilane, 2-norbornanemethyldiethoxysilane, diphenyldiethoxysilane and ethyl silicate.

As an amine having high steric hindrance, particularly preferred are 2,2,6,6-tetramethylpiperidine, 2,2,5,5-tetramethylpyrrolidine, derivatives of these, and tetramethylmethylenediamine. Of these compounds, an alkoxy (aryloxy) silane compound and diethers are particularly preferred as electron donors used as a catalyst component,.

In the present invention, it is also preferred to use a catalyst comprising a catalyst component (i) which has, as a ligand, a group having conjugated π electrons and contains a compound of a transition metal of the group IVB or VB of the periodic table and an organometallic compound catalyst component (ii).

The transition metal of the group IVB or VB of the periodic table includes zirconium, titanium, hafnium, chromium and vanadium.

The group having conjugated π electrons as a group, alkyl-substituted cyclopentadienyl groups such as methylcyclopentadienyl, ethylcyclopentadienyl, t-butylcyclopentadienyl, dimethylcyclopentadienyl and pentamethylcyclopentadienyl groups, an indenyl group, and a fluorenyl group.

Further, preferred is a group in which at least two ligands having such a cycloalkadienyl skeleton are bonded to each other through an alkylene group or a group containing silicon, phosphorus, oxygen or nitrogen.

Examples of such a group are ethylenebisindenyl and isopropyl(cyclopentadienyl-1-fluorenyl) groups.

The number of the ligand(s) having such a cycloalkadienyl skeleton, which coordinate with the transition metal, is at least one, preferably two.

The ligand other than the ligand having the cycloalkadienyl skeleton is a hydrocarbon group having 1 to 12 carbon atoms, an alkoxy group, an aryloxy group, a halogen or hydrogen.

The hydrocarbon group having 1 to 12 carbon atoms is selected from an alkyl group, a cycloalkyl group, an aryl group and an aralkyl group.

Specifically, the alkyl group includes methyl, ethyl, propyl, isopropyl and butyl groups.

The cycloalkyl group includes cyclopentyl and cyclohexyl groups.

The aryl group includes phenyl and tolyl groups.

The aralkyl group includes benzyl and neophyl groups.

The alkoxy group includes methoxy, ethoxy and butoxy groups.

The aryloxy group includes a phenoxy group.

The halogen includes fluorine, chlorine, bromine and iodine.

More specifically, the transition metal compound having the cycloalkadienyl skeleton, used in the present invention, is, when the transition metal is tetravalent, represented by the formula,

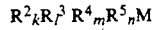

(wherein M is zirconium, titanium, hafnium or vanadium, R$^2$ is a group having a cycloalkadienyl skeleton, each of $R^3$, $R^4$ and $R^5$ is a group having a cycloalkadienyl group, an alkyl group, a cycloalkyl group, an aryl group, an aralkyl group, an alkoxy group, an aryloxy group, a halogen atom or hydrogen, k is an integer of not less than 1, and $k+l+m+n=4$).

Particularly preferred is a compound of the above formula in which each of $R^2$ and $R^3$ is a group having a cycloalkadienyl skeleton and these two groups having cycloalkadienyl skeletons are bonded to each other through a lower alkyl group or a group containing silicon, phosphorus, oxygen or nitrogen.

Specific examples of the transition metal compound having the above formula in which M is zirconium and containing a ligand having a cycloalkadienyl skeleton are as follows.

Bis(cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride hydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride,
bis(methylcyclopentadienyl)zirconium dichloride,
bis(t-butylcyclopentadienyl)zirconium dichloride,
bis(indenyl)zirconium dichloride,
bis(indenyl)zirconium dibromide,
bis(cyclopentadienyl)zirconiumdimethyl,
bis(cyclopentadienyl)zirconiumdiphenyl,
bis(cyclopentadienyl)zirconiumdibenzyl,
bis(cyclopentadienyl)zirconiummethoxy chloride,
bis(cyclopentadienyl)zirconiumethoxy chloride,
bis(methylcyclopentadienyl)zirconiumethoxy chloride,
bis(cyclopentadienyl)zirconiumphenoxy chloride,
bis(fluorenyl)zirconium dichloride,
ethylenebis(indenyl)diethylzirconium,
ethylenebis(indenyl)diphenylzirconium,
ethylenebis(indenyl)methylzirconium,
ethylenebis(indenyl)ethylzirconium monochloride,
ethylenebis(indenyl)zirconium dichloride,
isopropylbisindenylzirconium dichloride,
isopropyl(cyclopentadienyl)-1-fluorenylzirconium chloride,
ethylenebis(indenyl)zirconium dibromide,
ethylenebis(indenyl)zirconiummethoxy chloride,
ethylenebis(indenyl)zirconiumethoxy monochloride,
ethylenebis(indenyl)zirconiumphenoxy monochloride,
ethylenebis(cyclopentadienyl)zirconium dichloride,
propylenebis(cyclopentadienyl)zirconium dichloride,
ethylenebis(t-butylcyclopentadienyl)zirconium dichloride,
ethylenebis(4,5,6,7-tetrahydro-1-indenyl)dimethylzirconium,
ethylenebis(4,5,6,7-tetrahydro-1-indenyl)methylzirconium,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride, and
ethylenebis(4,7-dimethoxy-1-indenyl)zirconium dichloride.

There may be used those transition metal compounds prepared by replacing the zirconium of the above zirconium compounds with titanium, hafnium, chromium or vanadium.

The organometallic compound catalyst component (ii) is selected from conventionally known aluminooxane and an organoaluminumoxy compound. The organoaluminumoxy compound can be obtained, for example, by a reaction between an organoaluminum and water or between aluminooxane dissolved in a hydrocarbon solution and either water or an active hydrogen-containing compound.

The above organoaluminumoxy compound is insoluble or sparingly soluble in benzene at 60° C.

In the present invention, the amount of the catalyst for use varies depending upon the kind, etc., of the catalyst used. For example, when the above catalyst component (A), the above organometallic compound catalyst component (B) and the above electron donor (C) are used, or when the above catalyst components (i) and (ii) are used, the amount of the catalyst component (A) or the catalyst component (ii), as a transition metal, per liter of the polymerization volume is preferably 0.001 to 0.5 mmol, more preferably 0.005 to 0.5 mmol. And, the amount of the organometallic compound catalyst component (B) as a metal atom per mole of the transition metal atom of the catalyst component (A) in the polymerization system is preferably 1 to 10,000 mol, preferably 5 to 500 mol. Further, when the electron donor (C) is used, the amount of the electron donor (C) per mole of the transition metal atom of the catalyst component (A) in the polymerization system is preferably not more than 100 mol, more preferably 1 to 50 mol, particularly preferably 3 to 20 mol.

When the above catalyst is used, the polymerization temperature is usually between 20° C. and 200° C., preferably between 50° C. and 100° C., and the pressure is between atmospheric pressure and 100 kg/cm$^2$, preferably 2 kg/cm$^2$ and 50 kg/cm$^2$.

In the present invention, it is preferred to carry out preliminary polymerization in advance of the main polymerization. The preliminary polymerization is carried out in the presence of a catalyst comprising at least a combination of the catalyst component (A) with the organometallic compound catalyst component (B) or a combination of the catalyst component (i) with the catalyst component (ii).

In the preliminary polymerization, the polymerization amount per gram of titanium, when titanium is used as a transition metal, is preferably 1 to 2,000 g, more preferably 3 to 1,000 g, particularly preferably 10 to 500 g.

The preliminary polymerization is preferably carried out in the presence of an inert hydrocarbon solvent. The inert hydrocarbon solvent is specifically selected from aliphatic hydrocarbons such as propane, butane, n-pentane, i-pentane, n-hexane, i-hexane, n-heptane, n-octane, i-octane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbon compounds such as methylene chloride, ethyl chloride, ethylene chloride and chlorobenzene. Of these, preferred are aliphatic hydrocarbons. The monomer(s) to be reacted may be used as a solvent.

The $\alpha$-olefin to be reacted in the preliminary polymerization is specifically selected from $\alpha$-olefins having not more than 10 carbon atoms such as ethylene, propylene, 1-butene, 1-pentene, 4-methyl-1-pentene, 3-methyl-1-pentene, 1-heptene, 1-octene and 1-decene. Of these, preferred are $\alpha$-olefins having 3 to 6 carbon atoms, and particularly preferred is propylene. These $\alpha$-olefin may be used alone, or may be used in combination of two or more as far as the crystalline polymer is produced.

In order to obtain polymer particles containing a large amount of the noncrystalline olefin polymer portion and having excellent particle properties, e.g. polymer particles containing not less than 30% by weight of the noncrystalline olefin polymer portion and excellent particle properties, it is proposed to carry out the preliminary polymerization, e.g. in which propylene and ethylene are copolymerized using a gas mixture composed of 70 to 98 mol % of propylene and 30 to 2 mol % of ethylene.

The preliminary polymerization temperature varies depending upon not only the $\alpha$-olefin used but also the use of the inert solvent, and cannot be uniformly defined. However, the preliminary polymerization temperature is generally between $-40°$ C. and $80°$ C., preferably between $-20°$ C. and $40°$ C., particularly preferably $-10°$ C. and $30°$ C. For example, when propylene is used as an $\alpha$-olefin, the preliminary polymerization temperature is between $-40°$ C. and $40°$ C. When 1-butene is used, it is between $-40°$ C. and $40°$ C. When 4-methyl-1-pentene and/or 3-methyl-1-pentene are/is used, it is between $-40°$ C. and $70°$ C. Hydrogen gas may be co-present in the reaction system for the preliminary polymerization.

After having carried out the above preliminary polymerization, or without carrying out the preliminary polymerization, the above monomer(s) is introduced into the reaction system to carry out a polymerization reaction (main polymerization), whereby polymer particles can be produced.

The monomer(s) used in the main polymerization may be the same as, or different from, the monomer(s) used in the preliminary polymerization.

In the main polymerization, the polymerization temperature is preferably between $-50°$ C. and $200°$ C., more preferably $0°$ C. and $150°$ C. The polymerization pressure is preferably between atmospheric pressure and 100 kg/cm$^2$, more preferably between atmospheric pressure and 50 kg/cm$^2$. The polymerization can be carried out by any of batch-wise, semi-continuous and continuous methods.

The molecular weight of the olefin polymer to be produced can be adjusted on the basis of hydrogen and/or the polymerization temperature.

In the present invention, in general, the polymer particles obtained in the above manner is directly used for the graft reaction and the crosslinking reaction without subjecting them to the pulverization or granulation step.

According to the present invention, the above polymer particles are kneaded together with a graft modifier and a radical initiator while these components are melted.

For example, per 100 parts by weight of the above polymer particles, the graft modifier is incorporated in an amount of preferably 0.01 to 50 parts by weight, more preferably 0.1 to 40 parts by weight, and the radical initiator is incorporated in an amount of preferably 0.1 to 5 parts by weight. And, the resultant mixture is melted and kneaded to carry out graft modification and simultaneously, crosslink the polymer partially or completely.

In this case, the kneading apparatus is selected from open-type apparatus such as a mixing roll and closed-type apparatus such as a Banbury mixer, an extruder, a kneader and a continuous mixer. Of these apparatus, preferred is an extruder.

The kneading is preferably carried out within a closed-type apparatus and in an inert gas atmosphere of nitrogen or carbon dioxide gas. The temperature for the kneading is usually between $150°$ C. and $280°$ C., preferably between $170°$ C. and $240°$ C. The kneading time is usually 1 to 20 minutes, preferably 1 to 10 minutes.

The graft modifier in the present invention is usually selected from unsaturated carboxylic acids or derivatives thereof, unsaturated epoxy monomers and unsaturated hydroxy monomers.

Specific examples of the unsaturated carboxylic acids and derivatives thereof are $\alpha, \beta$-unsaturated carboxylic acids such as acrylic acid, methacrylic acid, maleic acid, fumaric acid, itaconic acid, citraconic acid and tetrahydrophthalic acid; unsaturated carboxylic acids such as bicyclo[2,2,1]hept-2-ene-5,6-dicarboxylic acid; anhydrides of $\alpha, \beta$-unsaturated carboxylic acids such as maleic anhydride, itaconic anhydride, citraconic anhydride and tetrahydrophthalic anhydride; anhydrides of unsaturated carboxylic acids such as bicyclo[2,2,1]hept-2-ene-5,6-dicarboxylic acid anhydride; esters of unsaturated carboxylic acids such as methyl acrylate, methyl methacrylate, dimethyl maleate, monomethyl maleate, dimethyl fumarate, dimethyl itaconate, diethyl citraconate, dimethyl tetrahydrophthalate anhydride and dimethyl bicyclo[2,2,1]hept-2-ene-5,6-dicarboxylate. Of these, preferred are maleic acid, bicyclo[2,2,1]hept-2-ene-5,6-dicarboxylic acid and anhydrides of these.

Specific examples of the unsaturated epoxy monomers are glycidyl esters of unsaturated monocarboxylic acids such as glycidyl acrylate, glycidyl methacrylate and glycidyl p-styrylcarboxylate; monoglycidyl or polyglycidyl esters of unsaturated polycarboxylic acids such as maleic acid, itaconic acid, citraconic acid, butenetricarboxylic acid, endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allylglycidyl ether, 2-methylallylglycidyl ether, glycidyl ether of o-allylphenol, glycidyl ether of m-allylphenol, glycidyl ether of p-allylphenol, glycidyl ether of isopropenylphenol, glycidyl ether of o-vinylphenol, glycidyl ether of m-vinylphenol and glycidyl ether of p-vinylphenol; and other compounds such as 2-(o-vinylphenyl)ethylene oxide, 2-(p-vinylphenyl)ethylene oxide, 2-(o-vinylphenyl)propylene oxide, 2-(p-vinylphenyl)propylene oxide, 2-(o-allylphenyl)ethylene oxide, 2-(p-allylphenyl)ethylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and allyl-2,3-epoxycyclopentyl ether.

Further, the unsaturated hydroxy monomers are monomers having at least one ethylenically unsaturated bond and at least one hydroxyl group. Specific examples thereof are hydroxyethyl acrylate, hydroxypropyl acrylate, hydroxyethyl methacrylate, hydroxypropyl methacrylate, polyethylene glycol monomethacrylate and polypropylene glycol monomethacrylate. Particularly preferred are hydroxyethyl (meth)acrylate and hydroxypropyl (meth)acrylate.

The above graft modifiers may be used alone or in combination.

In the present invention, since the graft reaction and the crosslinking reaction are carried out simultaneously as described above, the lower limit of the amount of the radical initiator is set at a higher level than the lower limit of the radical initiator used when the graft reaction alone is carried out.

The radical initiator is specifically selected from organic peroxides such as dicumyl peroxide, di-tert-butyl peroxide, 2,5-dimethyl-2,5-bis(tert-butylperoxy)hexane, 2,5-dimethyl-2,5-bis(tert-butylperoxy)hexyne-3, 1,3-(tert-butylperoxyisopropyl)benzene, 1,1-bis(tert-butylperoxy)-3,3,5-trimethylcyclohexane, n-butyl-4,4-bis(-tert-butylperoxy)valerate, dibenzoyl peroxide, and tert-butylperoxy benzoate. Of these, preferred are dibenzoyl peroxide and 1,3-bis(tert-butylperoxyisopropyl)benzene in views of the crosslinking reaction time, odor and scorch stability. The above radical initiators may be used alone or in combination.

In order to carry out the crosslinking reaction uniformly and moderately, it is preferred to incorporate a crosslinking aid. The crosslinking aid is specifically selected from peroxy crosslinking aids such as sulfur, p-quinonedioxime, p,p'-dibenzoylquinonedioxime, N-methyl-N,4-dinitrosoaniline, nitrobenzene, diphenylguanidine and trimethylolpropane-N,N'-m-phenylenedimaleimide; functional methacrylate monomers such as divinylbenzene, triallylcyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers such as vinyl butyrate and vinylstearate. By the use of these compounds, a uniform and moderate crosslinking reaction can be expected. In particular, divinylbenzene is easy to handle and excellent in compatibility to the polymer particles, and it works to solubilize organic peroxides and further works as a dispersion aid for peroxides. Therefore, a uniform crosslinking reaction can be carried out, and there can be obtained a thermoplastic elastomer which is well-balanced between the fluidity and physical properties. For these reasons, divinylbenzene is the most preferred.

In the present invention, the crosslinking aid is used in an amount, per 100 parts by weight of the polymer particles, of 0.1 to 2 parts by weight, particularly 0.3 to 1 part by weight. When the crosslinking aid in the above amount range is incorporated, there can be obtained a thermoplastic elastomer which has excellent fluidity and does not show any change in physical properties under a thermal history during processing and molding.

In the present invention, the polymer particles, the radical initiator and a crosslinking agent other than the radical initiator are melted and kneaded, whereby the graft reaction and the crosslinking reaction can take place simultaneously.

The above crosslinking agent is selected from sulfur, phenolic curing agents, oximes and polyamines. Of these, phenolic curing agents are preferred in view of physical properties of the resulting thermoplastic elastomer.

Specific examples of the phenolic curing agents are an alkylphenol formaldehyde resin, triazine-formaldehyde resin and a melamine-formaldehyde resin.

In the present invention, the amount of the crosslinking agent other than the radical initiator per 100 parts by weight of the polymer particles is preferably 0.05 to 20 parts by weight, more preferably 0.1 to 10 parts by weight. In this case, the lower limit of the amount of the radical initiator may be set at a level of less than 0.02 parts by weight.

In the present invention, the graft reaction and crosslinking reaction of the polymer particles for the production of the thermoplastic elastomer may be carried out in the presence of a mineral oil type softening agent.

The mineral oil type softening agent generally refers to a high-boiling petroleum fraction which, when a rubber is to be processed with a roll, is used to decrease the intermolecular action force of the rubber for the purpose of easing the rubber processing, and to facilitate dispersion of carbon black, white carbon, etc., and decrease the hardness of the cured rubber for the purpose of improving the flexibility or elasticity. Specifically, it is selected from paraffinic, naphthenic or aromatic mineral oils.

The above mineral oil type softening agent further improves the thermoplastic elastomer in its flow properties, i.e. moldability. It is therefore incorporated in an amount, per 100 parts by weight of the polymer particles, or preferably 1 to 100 parts by weight, more preferably 3 to 90 parts by weight, further preferably 5 to 80 parts by weight.

Further, the polymer particles used in the present invention or the thermoplastic elastomer produced in the present invention may preliminarily contain a stabilizer. Such a stabilizer is specifically selected from phenolic stabilizers, phosphorus type stabilizers, ionic stabilizers, hindered amine type stabilizers and higher fatty acid type stabilizers.

The above stabilizer may be incorporated in an amount, per 100 parts by weight of the polymer particles, of preferably 0.01 to 10 parts by weight, more preferably 0.05 to 5 parts by weight.

The thermoplastic elastomer produced in the present invention may also contain filler(s) such as calciumcarbonate, calcium silicate, clay, kaolin, talc, silica, diatomaceous earth, powdered mica, asbestos, alumina, barium sulfate, aluminum sulfate, calcium sulfate, basic magnesium carbonate, molybdenum disulfide, graphite, glass fibers, Shirasu balloon and carbon fibers, or colorant(s) such as carbon black, titanium oxide, zinc white, iron oxide red, ultramarine blue, Prussian blue, azo dye, nitroso dye, lake pigment and phthalocyanine pigment.

The thermoplastic elastomer obtained as above desirably has a cyclohexane-insoluble content (gel), which is not extracted into cyclohexane and measured in the following manner, of preferably not less than 40% by weight, more preferably 40 to 100% by weight, further preferably 60 to 99% by weight, particularly preferably 80 to 98% by weight.

The above gel content of 100% by weight shows that the resultant thermoplastic elastomer has been completely crosslinked.

The thermoplastic elastomer is measured for its cyclohexane-insoluble content as follows. About 100 mg of sample pellets (size 1 mm×1 mm×0.5 mm) are weighed from the thermoplastic elastomer, and immersed in 30 cc of cyclohexane within a closed container at 23° C. for 48 hours. The sample pellets are then taken out and dried. When the thermoplastic elastomer contains a cyclohexane-insoluble filler, pigment, etc., the weight of the cyclohexane-insoluble filler, pigment, etc. other than the polymer components is deducted from the weight of the above-obtained dried residue, and the remainder is taken as corrected final weight (Y) after drying. On the other hand, the weight of the cyclohexane-soluble components other than the ethylene,α-olefin copolymer, e.g. the plasticizer and the cyclohexane-soluble rubber component and the weight of cyclohexane-insoluble filler, pigment, etc., other than the polyolefin resin when the thermoplastic elastomer contains the cyclohexane-insoluble filler, pigment, etc., are deducted from the weight of the sample pellets, and the remainder is taken as a corrected initial weight (X).

On the basis of the above-obtained values and the following equation, the cyclohexane-insoluble content is determined.

$$\text{Cyclohexane-insoluble content (\%)} = \frac{\text{corrected final weight }(Y)}{\text{corrected initial weight }(X)} \times 100$$

The crosslinked thermoplastic elastomer produced according to the present invention desirably has a boiling p-xylene-insoluble content of advantageously at least 40% by weight, preferably 60 to 99% by weight, more preferably 80 to 98% by weight.

The thermoplastic elastomer is measured for a boiling p-xylene-insoluble content as follows. About 0.5 g of sample pellets (size: 1 mm×1 mm×0.5 mm) are precisely weighed, and wrapped in a 400 mesh stainless steel metal netting (90 mm×60 mm, its weight measured in advance) such that no sample pellets come out.

The metal netting containing the sample is placed in boiling xylene and is allowed to stand for 6 hours, during which the xylene is continuously stirred. After the extraction, the metal netting with the sample were throughly dried, and weighed.

The weights of the sample before and after the extraction are corrected in the same manner as in the correction of the above cyclohexane-insoluble content, and the boiling p-xylene-insoluble content is calculated also similarly.

In the thermoplastic elastomer obtained according to the present invention, the graft amount of the grafting agent based on the total weight of the polymer particles is preferably 0.01 to 50% by weight, more preferably 0.1 to 40% by weight, further preferably 0.2 to 20% by weight.

According to the present invention, there is provided a thermoplastic elastomer at a low cost, which is capable of giving a molded article having not only excellent elasticity but also high strength even with a low rubber content, and being uniform and excellent in strength properties such as impact strength, tensile strength, etc., tenacity, heat resistance, low-temperature flexibility, surface smoothness, coatability, and the like.

Being not only excellent in the above properties, but also remarkably excellent in thermal adhesion to various resins and different materials such as metals, the thermoplastic elastomer obtained according to the present invention can be suitably used in laminates with various resins and metal-coated articles. Specifically, the thermoplastic elastomer obtained according to the present invention is widely usable in automobile interior fittings such as an instrument panel and door trim, automobile outer fittings such as a side protect mall, a bumper, a soft fascia and a mud guard; automobile gaskets such as a glass run channel and a windowshield gasket; building gaskets; civil engineering and construction waterproof sheets, industrial-use hoses and tubes; housings for household electric appliances; shoes; sports goods; stationary goods; etc.

The thermoplastic elastomer obtained according to the process of the present invention can be molded with molding apparatus used for ordinary thermoplastic polymers, and is suitable for extrusion molding, shaping with a calender and particularly injection molding.

EXAMPLES

The present invention will be explained further in detail hereinafter by reference to Examples, to which, however, the present invention shall not be limited.

- Preparation of Catalyst Component (A):

A high-velocity stirrer having an internal volume of 2 liters (supplied by Tokushu Kika Kogyo K. K.) was subjected to full replacement of air with $N_2$, and charged with 700 ml of purified kerosine, 10 g of commercially available $MgCl_2$, 24.2 g of ethanol and 3 g of Emasol 320, trade name (sorbitan distearate, supplied by Kao Atlas K. K.). The temperature of the system was elevated with stirring, and the system was stirred at 120° C. at 800 rpm for 30 minutes. While the system was stirred at a high velocity, the liquid was transferred to a 2-liter glass flask (with a stirrer), which had been preliminarily charged with 1 liter of purified kerosine cooled to a temperature of −10° C., using a Teflon tube having an internal diameter of 5 mm. The liquid was filtered to obtain a solid formed, and the solid was fully washed with hexane to give a carrier.

7.5 Grams of the carrier was suspended in 150 ml of titanium tetrachloride at room temperature, and after addition of 1.3 ml of diisobutyl phthalate, the temperature of the system was elevated to 120° C. The mixture was stirred at 120° C. for 2 hours, and then filtered to recover a solid portion. The solid portion was again suspended in 150 ml of titanium tetrachloride, and the mixture was again stirred at 130° C. for 2 hours. The resultant reaction mixture was filtered to recover a solid reaction product, and the solid reaction product was washed with a sufficient amount of purified hexane to give a solid catalyst component (A). This component (A) contained, as atoms, 2.2% by weight of titanium, 63% by weight of chloride, 20% by weight of magnesium and 5.5% by weight of diisobutyl phthalate. The component (A) was a spherical catalyst having an average particle size of 64 μm and a particle size distribution of which the geometric standard deviation (δg) was 1.5.

Preliminary Polymerization:

The catalyst component (A) was subjected to the following preliminary polymerization.

A 400 ml glass reactor which had been subjected to replacement of air with nitrogen was charged with 200 ml of purified hexane, and then charged with 20 mmol of triethylaluminum, 4 mmol of diphenyldimethoxysilane and 2 mmol, as a titanium atom, of the above Ti catalyst component (A). Thereafter, propylene was fed to the reactor at a rate of 5.9 Nl/hour over 1 hour to polymerize 2.8 g of propylene per gram of the Ti catalyst component (A). During the polymerization, the temperature was kept at 20±2° C. After this preliminary polymerization, the polymerization mixture was filtered to remove the liquid portion, and the remaining solid portion was again suspended in decane.

Polymerization:

Preparation of Copolymer (1):

A 20-liter polymerizer was charged with 2.0 kg of propylene and 19 Nl of hydrogen at room temperature, and the temperature of the mixture was elevated. When the temperature reached 50° C., 15 mmol of triethylaluminum, 1.5 mmol of dicyclohexyldimethoxysilane and 0.05 mmol, as a titanium atom, of the catalyst component (A) treated in the above preliminary polymerization were added, and the temperature inside the polymerizer was kept at 70° C. Thirty minutes after the temperature reached 70° C., the vent valve was opened to effect purging until the pressure in the propylene polymerizer became atmospheric pressure and produce a propylene homopolymer. After the purging, the copolymerization was carried out. That is, 480 Nl/hour of ethylene, 720 Nl/hour of propylene and 12 Nl/hour of hydrogen were introduced into the polymerizer. The pressure in the polymerizer was set at 10 kg/cm$^2$.G by adjusting the opening degree of the vent, and the temperature in the polymerizer was kept at 70° C. The copolymerization was continued for 150 minutes.

Table 1 shows the physical properties of the resultant copolymer (1).

TABLE 1

| Copolymer (1) | (1) |
| --- | --- |
| Propylene homopolymerization | |
| Propylene (kg) | 2.0 |
| Hydrogen (Nλ) | 19 |
| Polymerization time (minute) | 30 |
| Propylene-ethylene copolymerization | |
| Ethylene (Nλ/H) | 480 |
| Propylene (Nλ/H) | 720 |
| Hydrogen (Nλ/H) | 12 |
| Polymerization temperature (°C.) | 70 |
| Polymerization time (minute) | 150 |
| Physical properties of the copolymer obtained | |
| MFR | 3.7 |
| Ethylene content (mol %) | 27 |
| n-Decane-soluble content (wt. %) | 29 |

EXAMPLE 1

100 Parts by weight of the above-obtained copolymer (1), 0.2 part by weight of 1,3-bis(tert-butylperoxyisopropyl)benzene (to be abbreviated as "peroxide A" hereinafter) and 1 part of maleic anhydride were mixed with a tumbler blender, and the resultant mixture was extruded with an extruder under a nitrogen atmosphere at 210° C. to give pellets of a thermoplastic elastomer.

The above copolymer (1) powder had an average particle diameter of 2,200 μm, an apparent bulk density of 0.45 g/ml, a 150 mesh-passing particle amount of 0.1% by weight and a drop time of 8.3 seconds. Further, the geometric standard deviation of these polymer particles was 1.5.

The above-obtained pellets were evaluated on their physical properties as follows.

The pellets were injection-molded with the following machine under the following conditions to prepare a square plate having a thickness of 3 mm. Test pieces were taken from the plate, and measured for tensile properties, spring hardness, flexural initial modulus and Izod impact strength.

(Injection molding)
Molding machine: Dinamelter (Meiki Seisakusho)
Molding temperature: 220° C.
Injection pressure:
 primary pressure 100 kg/cm$^2$
 secondary pressure 700 kg/cm$^2$
Injection pressure: Highest
Molding rate: 90 sec/cycle
Gate: Direct gate
(land length 10 mm, width 10 mm, depth 3 mm)
Molded article: length 150 mm, width 120 mm, thickness 3 mm (Basic properties)

Test pieces were punched out from a 3 mm thick plate obtained by the above injection molding, and measured as follows.

Tensile properties: Measured according to the method described in JIS K-6301.
Tensile strength at breaking point (TB, kg/cm$^2$)
Elongation at breaking point (EB, %)
Spring hardness (HS): Measured according to the Shore D type method described in ASTM D 2240.
Flexural initial modulus (FM): Measured according to the method described in ASTM D 790.
Izod impact strength (Izod): Measured according to the method described in ASTM D 256.

Pellets of the above thermoplastic elastomer were extruded with the following machine under the following conditions to form a sheet, and the sheet was evaluated on thermal adhesion to different materials as follows.

(Extrusion molding)

A T-die sheet was extrusion-molded under the following conditions.

Molding machine: 40 mmφ extruder (supplied by Toshiba Machine Co., Ltd)
Screw:
 Full-flighted type
 L/D=28, CR=3.5
Screen pack: 80 mesh×2
Molding temperature: 160° C. at hopper, 210° C. at die
Die: Coathanger type die.
Die lips: 1.5 mm
Take up rate: 5 m/minute (Adhesion strength)

A. Preparation of test pieces

A test piece having a size of 150 mm×150 mm was prepared by press-molding the thermoplastic elastomer extrusion sheet (thickness 1.0 mm) obtained under the above conditions and an adherend having a thickness of 0.5 mm (clamping pressure 50 ton).

The adherend was selected from the following.

Nylon: nylon 6 (Amirane CM1021) supplied by Toray Industries, Inc.

Polyurethane: P26 SRNAT supplied by Nippon Urethane K. K.

Steel plate: SS-41 supplied by Nippon Test Panel (Surface roughness 30 microns, sand-blasted)

B. Peel test

Test piece:

Punched out in a form having a width of 25 mm and a length of 100 mm.

Test method: Peel at 180 degrees

Pull rate: 25 mm/minute

Adhesion strength: Value (unit: kg/cm) obtained by dividing a peel load by the width of the test piece.

In addition, "fracture" refers to a case in which the substrate was fractured.

Table 2 shows the results of the above evaluation.

EXAMPLE 2

Example 1 was repeated except that the maleic anhydride was replaced with glycidyl methacrylate, whereby pellets of a thermoplastic elastomer were obtained. The pellets were evaluated on their physical properties.

Table 2 shows the results.

EXAMPLE 3

Example 1 was repeated except that the maleic anhydride was replaced with hydroxypropyl methacrylate, whereby pellets of a thermoplastic elastomer were obtained. The pellets were evaluated on their physical properties.

Table 2 shows the results.

EXAMPLE 4

Example 1 was repeated except that the amount of the peroxide A was changed to 0.02 parts by weight and that 10 parts by weight of an alkylphenol resin (SP 1056, supplied by Schenectady) was used as a crosslinking agent, whereby pellets of a thermoplastic elastomer were obtained. The pellets were evaluated on their physical properties.

Table 2 shows the results.

COMPARATIVE EXAMPLE 1

Example 1 was repeated except that 1 part by weight of the maleic anhydride was replaced with 0.3 part by weight of divinylbenzene, whereby pellets of a thermoplastic elastomer were obtained. The pellets were evaluated on their physical properties.

Table 2 shows the results.

TABLE 2

| | Ex. 1 | Ex. 2 | Ex. 3 | Ex. 4 | CEx. 1 |
|---|---|---|---|---|---|
| Cyclohexane-insoluble content (wt. %) | 80 | 82 | 81 | 90 | 80 |
| Boiling p-xylene-insoluble content (wt. %) | 78 | 81 | 82 | 88 | — |
| Graft amount (wt. %) | 0.92 | 0.75 | 0.90 | 0.93 | — |
| Tensile properties | | | | | |
| TB (kg/cm$^2$) | 232 | 234 | 233 | 235 | 31 |
| EB (%) | 630 | 640 | 620 | 630 | 641 |
| Spring hardness (Shore D) | 49 | 49 | 49 | 49 | 49 |
| Flexural initial modulus (kg/cm$^2$) | 4,800 | 4,800 | 4,800 | 4,800 | 4,800 |
| Izod Impact strength (−30°) (kg·cm/cm) | N.B. | N.B. | N.B. | N.B. | N.B. |
| Adhesion strength (kg/cm) | | | | | |
| to nylon | fracture | fracture | 3.8 | fracture | 0.2 or less |
| to polyuretane | 0.7 | 3.5 | 5.5 | 0.8 | 0.2 or less |
| to steel plate | fracture | fracture | fracture | fracture | 0.2 or less |

(Note)
N.B.: No breaking of material

We claim:

1. A process for producing a graft-modified and crosslinked thermoplastic elastomer, which comprises melting and kneading a material mixture containing
    (A) polymer particles comprising a crystalline olefin polymer portion and a noncrystalline olefin polymer portion, said polymer particles having a sea-islands structure with said islands comprised of said noncrystalline olefin polymer portion, said islands having an average diameter of not more than 0.5 μm,
    (B) a graft-modifier, and
    (C) a radical initiator to form a graft-modified and crosslinked thermoplastic elastomer having a cyclohexane-insoluble content of at least 40% by weight.

2. The process of claim 1, wherein the material mixture further contains at least one compound selected from the group consisting of (D) a crosslinking agent (excluding the radical initiator), (E) a crosslinking aid and (F) a mineral oil softening agent.

3. The process of claim 1, wherein the (A) polymer particles comprise 20 to 80% by weight of a crystalline olefin polymer portion and 80 to 20% by weight of a noncrystalline olefin polymer portion.

4. The process of claim 1, wherein the (A) polymer particles have an average particle diameter of not less than 10 μm.

5. The process of claim 1, wherein the polymer forming the (A) polymer particles is a homo- or copolymer of an α-olefin having 2 to 20 carbon atoms.

6. The process of claim 1, wherein the (B) graft-modifier is selected from the group consisting of an unsaturated carboxylic acid or a derivative thereof, an unsaturated epoxy monomer and an unsaturated hydroxy monomer.

7. The process of claim 1, wherein the (C) radical initiator is an organic peroxide.

8. The process of claim 1, wherein the material mixture contains, per 100 parts by weight of the (A) polymer particles, 0.01 to 50 parts by weight of the (B) graft modifier and 0.1 to 5 parts by weight of the (C) radical initiator.

9. The process of claim 2, wherein the (D) crosslinking agent is selected from the group consisting of sulfur, a phenolic curing agent, oximes and a polyamine.

10. The process of claim 2, wherein the (D) crosslinking agent is contained in an amount of 0.05 to 20 parts by weight per 100 parts by weight of the (A) polymer particles.

11. The process of claim 2, wherein the crosslinking agent (E) is a peroxy crosslinking aid or a polyfunctional vinyl monomer.

12. The process of claim 2, wherein the crosslinking agent (E) is contained in an amount of 0.1 to 2 parts by weight per 100 parts by weight of the (A) polymer particles.

13. The process of claim 2, wherein the (F) mineral oil type softening agent is paraffinic, naphthenic or aromatic petroleum fraction having a high boiling point.

14. The process of claim 2, wherein the mineral oil type softening agent (F) is contained in an amount of 1 to 100 parts by weight per 100 parts by weight of the (A) polymer particles.

15. The process of claim 1, wherein the graft-modified and crosslinked thermoplastic elastomer contains at least 40% by weight of a boiling p-xylene-insoluble content.

16. A graft-modified and crosslinked thermoplastic elastomer having a cyclohexane-insoluble content of at least 40% by weight, produced by the process of claim 1.

17. The process of claim 1, wherein the polymer particles have a thermal history in which said polymer particles substantially have not been heated up to a temperature which is equal to or higher than the higher temperature of (i) the melting point of the crystalline olefin polymer portion or (ii) the glass transition temperature of the noncrystalline olefin polymer portion.

18. The process of claim 1, wherein the polymer particles have an average particle diameter of 10 to 5,000 μm.

* * * * *